United States Patent [19]

Fedder et al.

[11] 4,403,235

[45] Sep. 6, 1983

[54] OPTICAL SCANNING AND IMAGING SYSTEM UTILIZING LASER DIODE

[75] Inventors: Richard C. Fedder, Longwood; George C. Schafner; William M. Ward, both of Orlando, all of Fla.

[73] Assignee: Burroughs Corporation, Orlando, Fla.

[21] Appl. No.: 276,260

[22] Filed: Jun. 23, 1981

[51] Int. Cl.³ ............................................. G01D 15/14
[52] U.S. Cl. .................................................. 346/160
[58] Field of Search ................ 346/76 L, 139 R, 108, 346/109, 160; 101/DIG. 13; 250/236; 350/6.7, 6.8; 358/293, 300

[56] References Cited

U.S. PATENT DOCUMENTS

| | | | |
|---|---|---|---|
| 3,720,785 | 3/1973 | Van Auken | 346/160 X |
| 3,751,587 | 8/1973 | Insler et al. | 358/293 |
| 3,910,675 | 11/1974 | MacGovern | 350/6.7 |
| 4,002,830 | 1/1977 | Brown et al. | 358/293 |
| 4,059,833 | 11/1977 | Kitamora et al. | 346/108 |
| 4,084,197 | 4/1978 | Starkweather | 358/300 |
| 4,140,903 | 2/1979 | Clark | 250/236 |
| 4,195,316 | 3/1980 | Sausome | 358/293 X |

*Primary Examiner*—Thomas H. Tarcza
*Attorney, Agent, or Firm*—Kevin R. Peterson; Carl Fissell, Jr.; Edmund M. Chung

[57] ABSTRACT

Photo-optical reproducing, copying/printing apparatus wherein a solid state laser diode is caused to emit a divergent beam of light which is collected and collimated. A cylindrical multi-element lens shapes the beam first in a vertical and then in a second horizontal plane for impingement upon a rotating polygonal mirror assembly. A spherical multi-element lens thereafter focusses the laser beam as scanned by the rotating mirror assembly through a cylindrical lens assembly so as to scan across the surface of a photo receptor drum assembly horizontally, rotatably disposed adjacent to a cylindrical lens producing a latent image on the drum. The scanned image is then electrophotographically developed at the drum by first toning the image and thereafter causing the image to be transferred from the drum to a fuseable item such for example as paper which is adapted to pass across the surface of the drum in contact therewith. Each of the active elements of the photo-optical system is adjustable relative to the axis of the laser light beam permitting accurate, extremely high definition data output. The photo-optical system is also made as a modular assembly which is capable of being used with a number of different speeds of associated apparatus so that only the associated apparatus need be adapted, changed or reoriented to the basic photo-optical reproducing, copying/printing apparatus.

10 Claims, 6 Drawing Figures

OPTICAL SCANNING AND IMAGING SYSTEM UTILIZING LASER DIODE

BACKGROUND OF THE INVENTION

1. Field of the Invention

This invention relates to photo-optical scanning apparatus utilizing a laser diode light generating device and a polygonal mirror assembly in conjunction with suitable light beam collimating and focussing apparatus. More specifically, the invention relates to a system for precisely shaping the laser generating light beam into an efficient spot scanning size for electrophotographic printing and/or copying.

2. Description of the Prior Art

Many problems are associated with scanning systems wherein a modulated/or unmodulated light beam is caused to scan by means of a rotatable polygonal mirror. For example the position of each scanning line becomes difficult to control. This problem is a result of the angular relationship between adjacent facets of the polygon as well as between the facet planes and the rotational axis of the polygon.

Another problem is associated with the location of the laser light generating apparatus and its angular relationship to the operably associated hardware. A further problem is that as the polygon mirror assembly is rotated at a constant rotational rate the speed of the generated spot will be constant along an arc but will not be constant with respect to a straight line scan. In fact, the laser beam or spot speeds up at the periphery of the scan line which in turn has the effect of changing the dimension of the output data being developed. These and other similarly associated problems have caused many of the prior art devices to be less than commercially satisfactory.

SUMMARY OF THE INVENTION

It is, therefore, an object for the present invention to overcome each of these problems in a new, novel and heretofore unobvious manner and to provide a photo-optical solid state laser diode scanning system wherein a solid state laser is caused to produce a divergent beam of visible electromagnetic radiation which is collected and collimated and thereafter optically shaped to reduce the vertical dimension while expanding the horizontal dimension for subsequent impingement upon a rotatable polygonal mirro assembly. The collimated laser beam is then focused onto a photoconductor, for example, a rotatable drum, through a cylindrical lens and a light folding mirror, passing through a spherical lens to the photoconductor itself.

A novel aspect of the invention is the provision for the apparatus to be modularly related and to be mounted to a rigid, fixed base member. Each element of the novel combination is adjustably, positionable relative to the base as well as to the axis of the laser beam, the lenses, mirrors and polygonal mirror facets thereby insuring an accurate, clear and highly defined, latent image on the photoconductor i.e. drum.

Another novel aspect of the present invention is the provision of a novel photoconductor drum charging, exposing, toning and cleaning apparatus for a laser diode and printing and/or copying apparatus utilizing a novel folded laser scanning light path in combination with a corna charging, discharging apparatus not heretofore available in electrophotographic processing apparatus.

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure and in which;

DESCRIPTION OF THE PREFERRED EMBODIMENT

Figure 1:
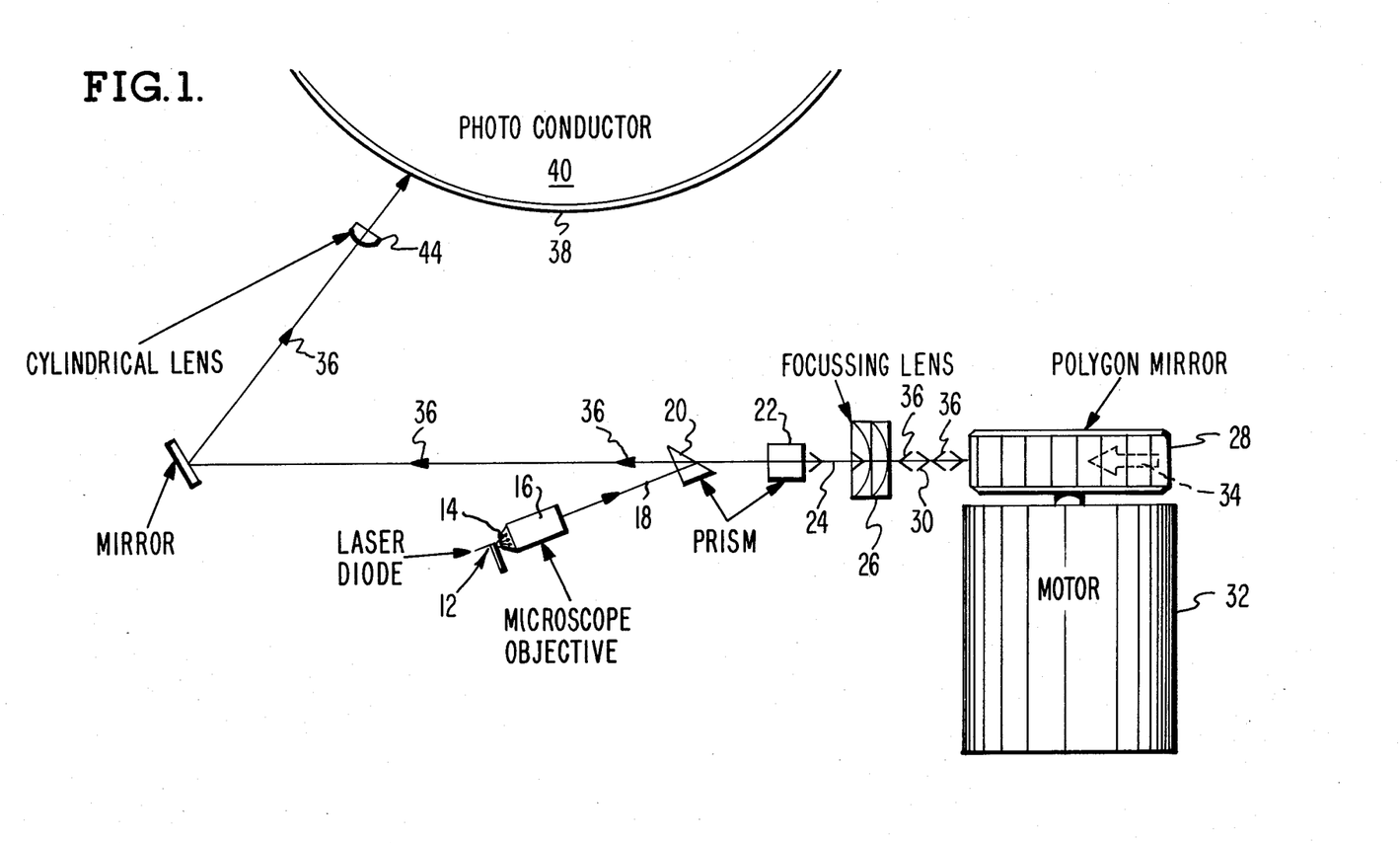
FIG. 1 is a schematic side elevational view, not to scale, of apparatus embodying the present invention.

In one of its broadest aspects the apparatus of the present invention is typified by the arrangements set forth schematically in FIG. 1. The laser diode printer apparatus 10 is seen to comprise a laser diode 12, energized in a known manner to produce a beam of electromagnetic radiation, arrow 14, which is adapted to be passed through a lens system 16 which acts to collimate the light beam 14 and direct the collimated light beam 18 into and through a pair of optical prisms 20 and 22, respectively, which act to change the beam from an elliptical cross section to a circular cross section.

The now collimated, altered, beam 24 of light is next directed through a focussing lens 26 to a rotatable polygonal mirror assembly 28. The focussed light beam 30 is reflected off the faces or facets of the polygon 28 as the latter is rotated by drive motor 32 in the direction of arrow 34. The rays 36 of the reflected beam are focused onto the photoconductive drum surface 38 of rotatable drum 40 via a tiltable mirror assembly 42 and a second focussing lens system 44, FIG. 1.

Figure 5:
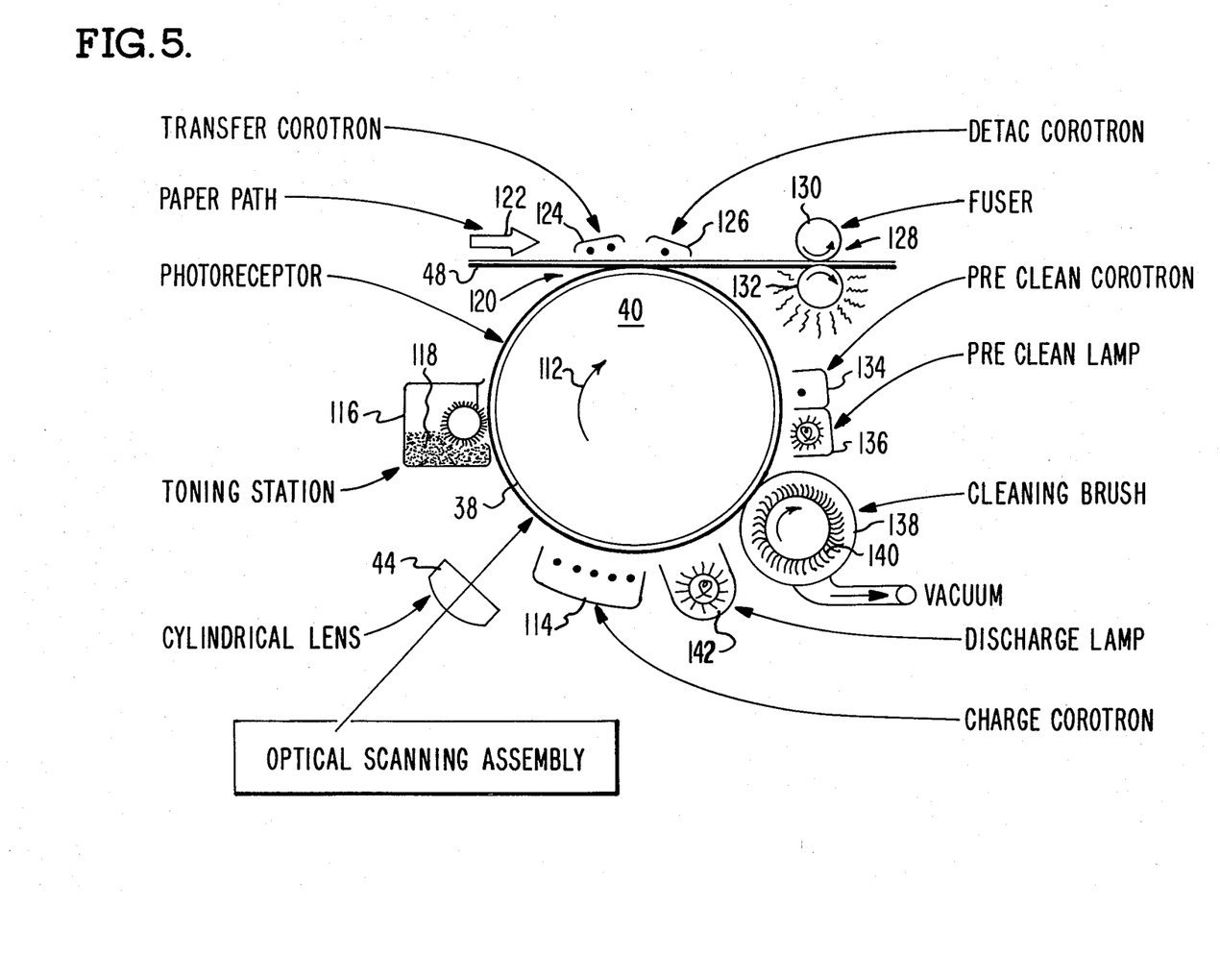
FIG. 5 is a schematic illustration, not to scale, of the electrophotographic process station of the present invention.
Figure 6:
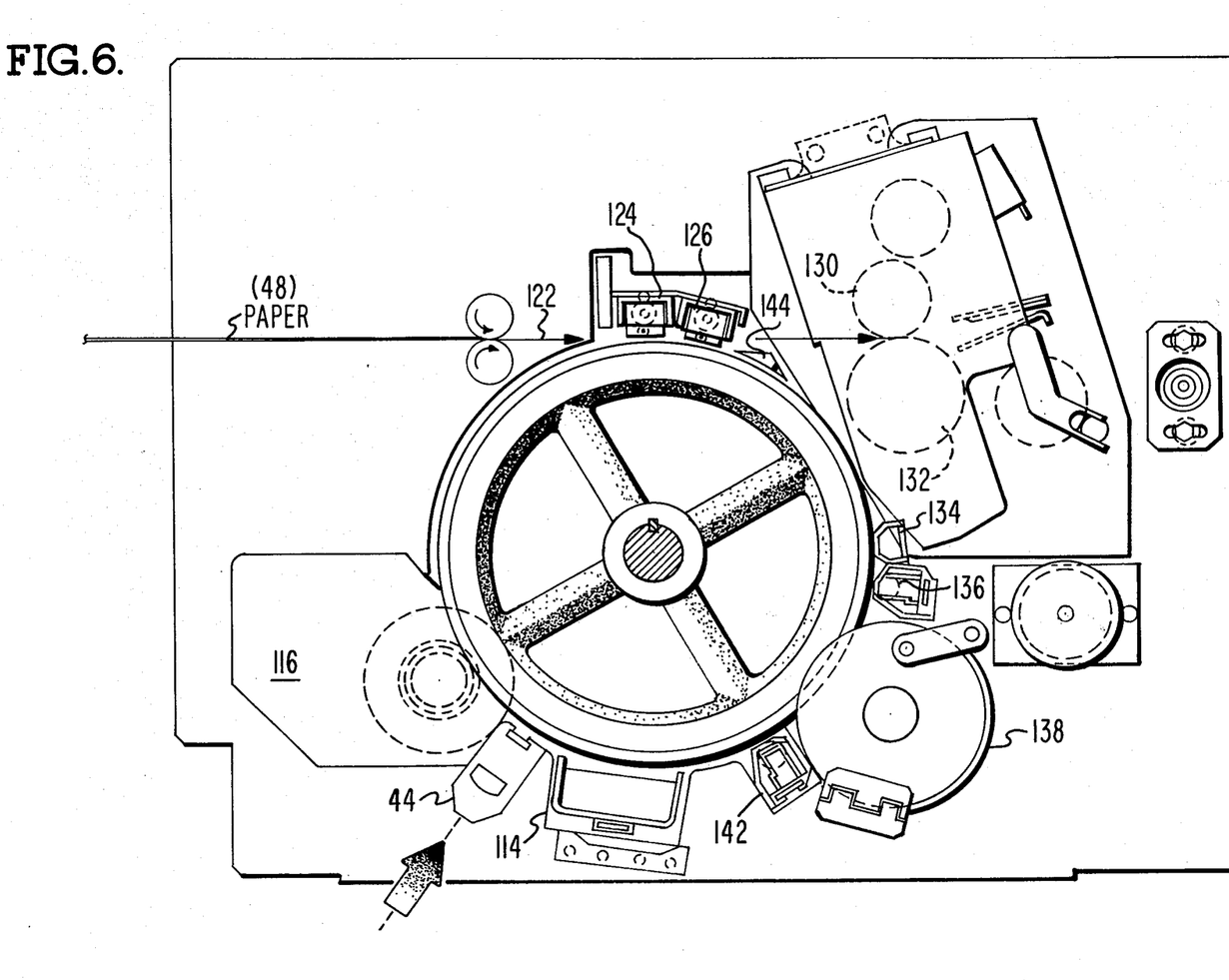
FIG. 6 is a detailed view of the apparatus illustrated in FIG. 5.

The focussed laser beam 46 is adapted to scan the cylindrical photoconductor surface 38 from edge to edge or side to side by means of the rotating polygon mirror 28 and drive motor 28. Modulation (by means not shown) of the laser diode 12 produces a latent electrostatic image upon the surface 38 of photoconductor 40. Copying and/or printing media 48, FIGS. 5 and 6, is adapted to receive the image of the intelligence carried by the latent electrostatic image by means of and in a manner to be described later on herein.

Figure 2:
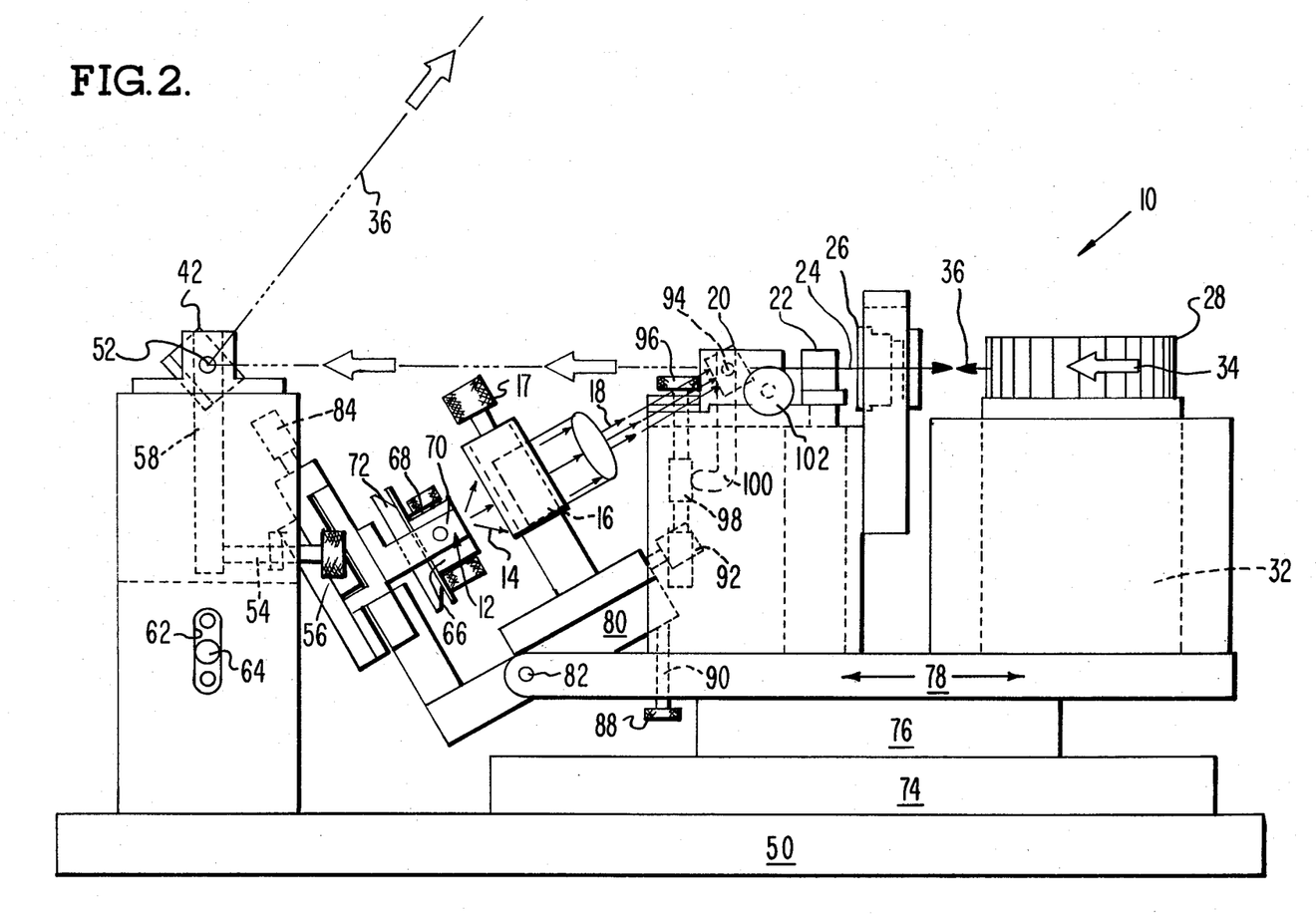
FIG. 2 is a detailed side elevational view of the apparatus of FIG. 1.

A physical embodiment of the apparatus 10 schematically illustrated in FIG. 1 is seen most clearly in the side elevational view of FIG. 2, to comprise a rigid base member 50 on which the entire assembly is mounted and adapted to be slideably moveable back and forth or right to left as the case may be. As earlier mentioned, mirror 42 is adapted to be tilted about its horizontal axis mounting pivot 52 so as to fold the laser beam 36 upwardly toward the cylindrical lens 44, FIG. 1. Tilting adjustment of the mirror 42 is provided by means of the threaded horizontal cross shaft 54 adjustably moveable by means of thumb wheel 56 against the vertical mirror support column 58 disposed in vertical mounting pillar 60 secured to base 50. Vertical, erectable movement of mirror 42 is provided by means of slot 62 and pin 64, as seen most clearly in FIG. 2.

The laser diode 12 (light generating element) is surrounded by a thermo-electric cooling member 66 and is gimbally mounted, as at 68 to support 70. A heat sink 72 of copper or similar material capable of rapidly and efficiently dissipating large quantities of heat abuts the laser diode assembly 12. The gimble pivoting arrangement 68 supports the heat sink 72 and cooling member 66 enabling the laser diode 12 to be pivoted about two orthogonal axes that pass directly through the diode chip. The laser diode temperature is regulated so as to be constant at approximately 20–21 degrees C. by a feedback controller with a thermistor sensor (not shown). It is necessary that the heat sink temperature, which is close to ambient, be somewhat above the control temperature since the thermoelectric device can only cool and cannot heat.

The laser light 14 emitted by the diode 12 is collected by the objective lens 16 which in one embodiment comprises a microscope objective having a magnification of 20 times. This is necessary since the output area (of the diode is about two tenths micron by about five microns) from which light is being emitted and is extremely small. The objective lens 16 has the laser light at its focus. The light enters the lens as a diverging set of light rays 14 from the laser diode 12. The objective lens 16 collimates the light, as seen most clearly in FIG. 2. Since the light from the diode 12 is diverging on the entering side of lens 16 and is collimated on the exiting side thereof, the beam is not generally circular but rather oblong or elliptical in cross section.

In order to correct for this two separate but optically complimentary photo-optical elements are employed. The collimated light is first passed through prism 20 which is configured so as to compress the beam in the vertical plane or direction down to approximately one tenth inch. Thereafter, the beam is redirected into and through prism 22 which is constructed such that the light beam is expanded slightly in the horizontal direction. Exiting from the second prism 22 the light beam now has a circular cros section and is collimated before entering focussing lens 26.

Except for the tiltable mirror 42, which is provided with its own separate individual adjustable mounting means, previously described, each of the lenses and prisms heretofore mentioned are provided with separate means for orthogonally positioning these elements relative to each other as well as with respect to the axis of the laser light beam.

Figure 4:
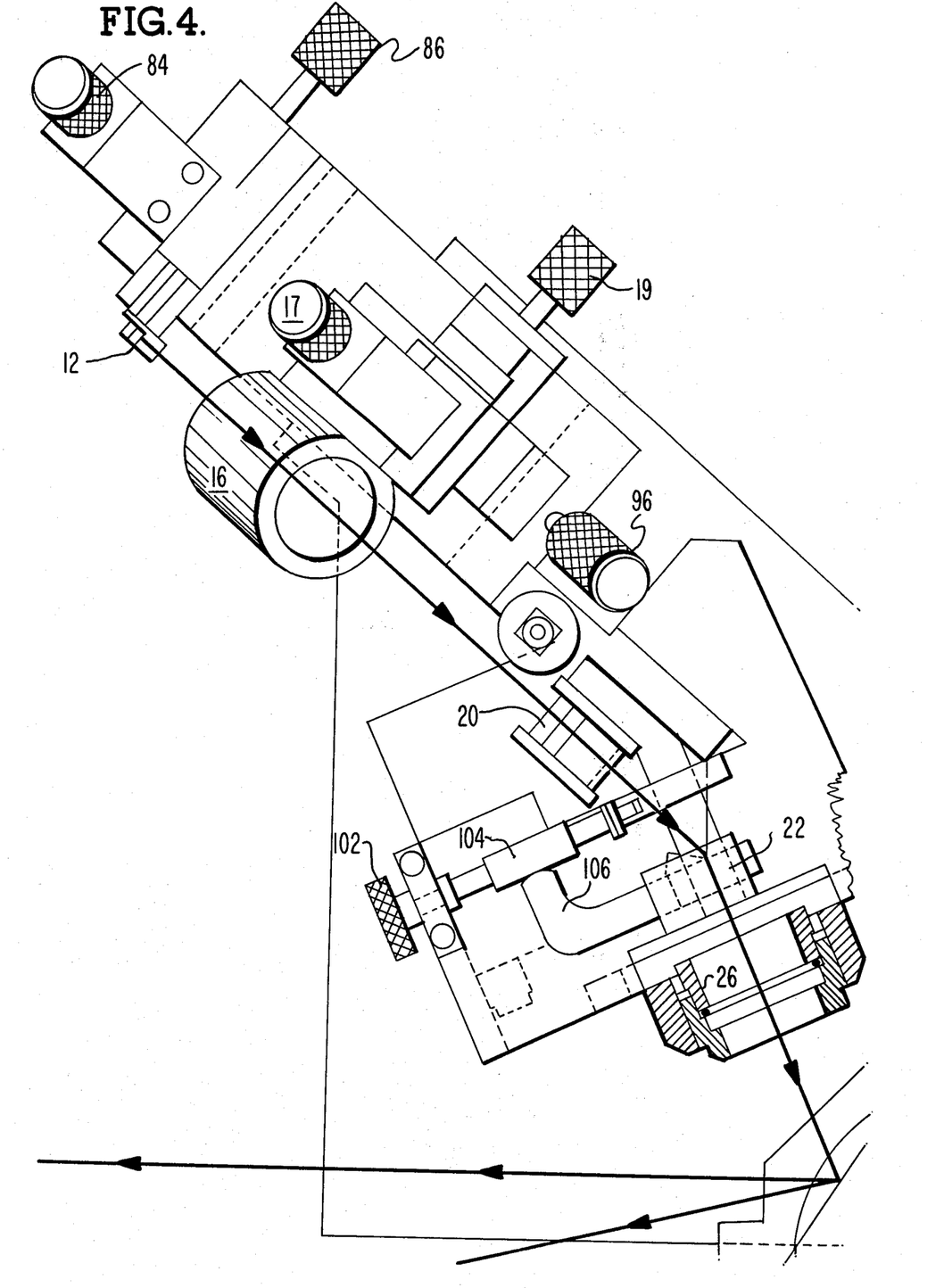
FIG. 4 is a detailed top plan view of the apparatus of FIG. 3;.

A rigid elevating platform 74 is secured to the base 50 to which is mounted, as by bolts (not shown) a second rigid mount 76. Member 76 provides oppositely disposed parallel guiding tracks (not shown) for slideably moving support member 78. To one end of the member 78 is secured a rockably, pivoted support member 80 arcuately moveable about pivot 82 on the leftward projecting end of the member 78. Member 80 provides a tiltable support for the laser diode 12 including its heat sink 72 as well as for the objective lens assembly 16 and its adjusting means. Vertical, slideable, adjustment for diode 12 is controlled and actuated by means of micrometer slides and the knurled thumb wheel 84. The horizontal adjustment is by means of thumb wheel 86, FIG. 4. Rocking movement for platform 80 to axially align the laser beam 14 is provided by means of the threaded adjusting wheel 88 which is adapted to rockably pivot the member 80 about pivot 82 by means of threaded shaft 90 against the rightward end of member 80. Sliding, focussing adjustment for objective lens assembly 16 is provided by thumb wheel and shaft assembly 92 at the rightward end of member 80.

Laser beam light rays 18 pass, as before mentioned, through a compression prism 20 which is angularly, adjustably mounted on a horizontal pivot 94 and tiltable about this pivot by means of thumb wheel 96, cam 98 and L-shaped follower link 100. Adjustment movement of prism 72 is accomplished by means of thumb wheel 102, FIGS. 2 and 4, cylindrical cam 104 and L-shaped cam follower 106 secured to prism 22. Focussing lens 26 is threadedly, adjustable backwards and forward for accurate focussing by rotation within the lens support 108.

The focussed laser light beam 30 after passing through the focussing lens 26 is reflectively scanned across the surface 38 of photoconducting drum member 40 in a manner such that the data or intelligence contained in the modulated beam is placed upon the drum for copying/printing purposes, as will be hereinafter described.

Polygon mirror 28, rotating in the direction of arrow 34 by drive motor 32 carries 20 mirror facets and rotates at the rate of 12,558 RPM. The laser light is passed from the focussing lens 26 to the face of each mirror facet so as to scan through an angle of 36 degrees (as the polygon rotates) which is precisely twice the angle that the facet moves through during the period of time for one scan line. With the focussing lens 26 positioned in front of or before the polygon 28, the focal point tends to be on the arc of a sphere. Rather than in a plane this marks for correction problems since the beam 24 passes through the same point of this lens all the time. Additionally, as the polygon scanner 28 rotates, the deflected beam is rotating at a constant rotational rate so the speed will be constant on an arc but will not be constant on the straight scan line. The beam or spot speeds up at the periphery, which produces a small effect in changing the dimension of the characters.

Figure 3:
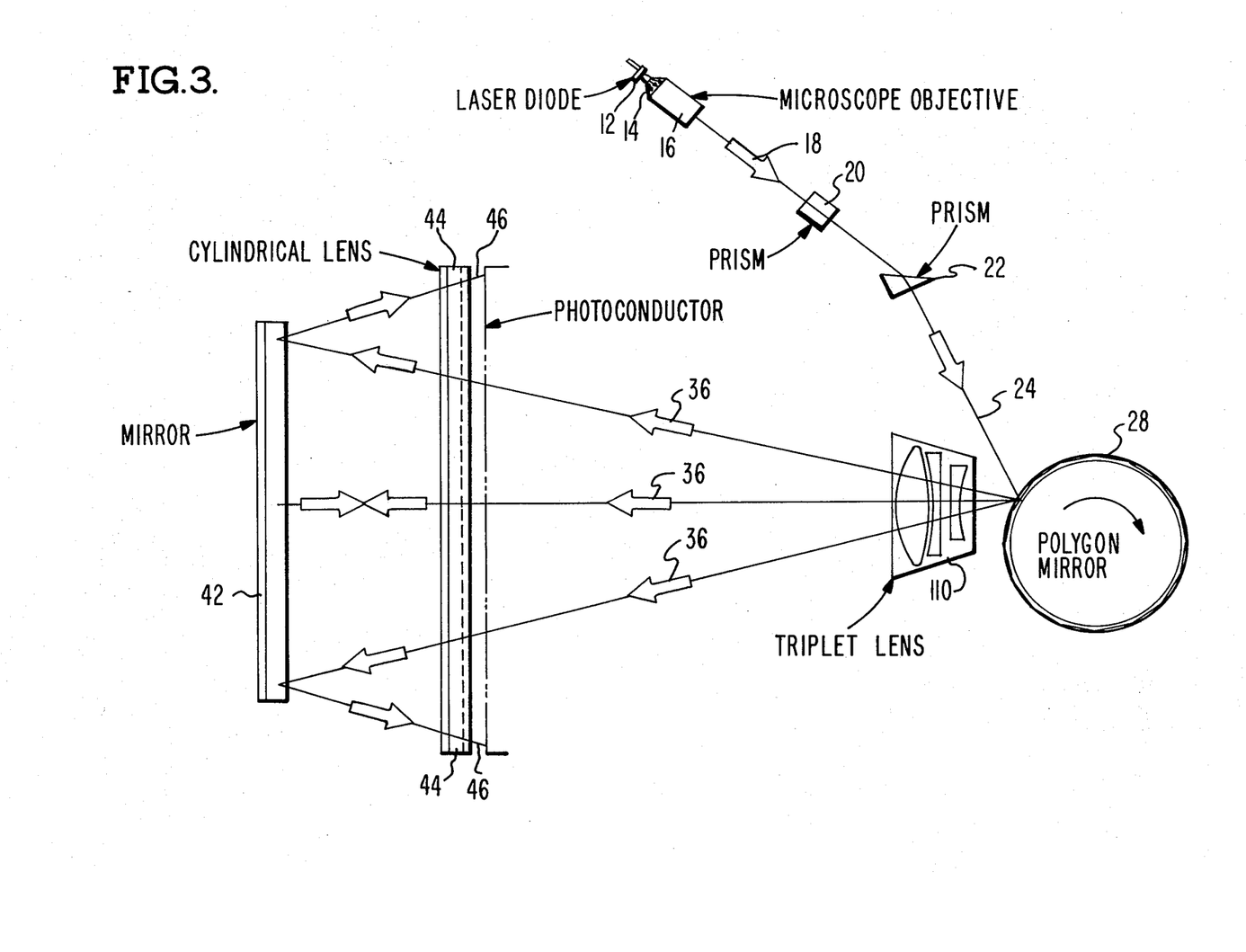
FIG. 3 is a schematic top end view not to scale, of the apparatus of FIGS. 1 and 2.

In the preferred embodiment as seen in FIG. 3 a focusing lens 110 is positioned after the polygon 28. This lens characterized as a F-theta lens (fe) and avoids the variation of lineal scan velocity with the scan angle. Normally, the spot displacement d of a simple lens varies as the focal length times the tangent of theta. (d = f tan e). It is possible to make an F-theta (fe) lens so that the lineal displacement varies as the focal length times theta (fe) itself. This allows a linear relationship between polygon rotation and spot position. Plus, it produces a flatter field so that the focus is in a plane (including the scan line). The (Fe) lens is triplet a lens.

As the polygon 28 turns the focussed light is reflected off tilt mirror 42 and angularly, upwardly into and through the elongated, focussing, cylindrical lens 44 to be raster scanned across the photoconductor 40. Only about 25 degrees of the total scan is used for the printed scan line. Located on the right hand side of the scan line facing the drum 40 is a start of scan detector (not shown) which is used to time the initiation of printing.

Lens 44 has a flat surface on one side and convex surface on the other side and is utilized to reduce the vertical or facet apex angle error, an error in the position of the beam due to wobbling of the facets from one facet to the other, i.e., the socalled change in the apex angle. (The angle between the axis of rotation of the polygon and the facet, varies from one facet to the other and this variation causes the beam to deflect slightly in the vertical direction). Utilization of cylindrical lens 44 reduces the effect of the wobble. The rotating polygon causes the light to scan a full raster scan length i.e. the width of the drum or the width of the line that is to be printed on the page one scan length for each facet on the polygon. Obviously, the more facets there are on the polygon the easier it is to reduce the RPM's required of this rotating device. For example, with only eight facets the device would have to be rotated at a high RPM to get the same number of scans per second. Scans per second is determined by the speed at which it is desired to print. For ninety pages per minute this is approximately 6,000 lines per minute. This is a lineal surface velocity on the drum of 17.42 inches per second. The raster line spacing is determined by the resolution desired for 240 dots per inch. Each raster line is spaced by 1 over 240. Thus, the raster scan lines are spaced 1/240th of an inch or 00417 inches apart. Dividing the raster line spacing by the velocity of the drum gives the time permitted for each scan line. The reciprocal of the scan line time gives the scan rate. In other words, the scan rate would be just equal to 17.44 inches per second by 0.00417 inches. However, since 0.00417 is equivalent to 1 over 240, the result can be expressed as 17.44 times 240 dots per inch. This gives a repetition rate for the scan in scans per second. Each scan occurs in approximately 239 microseconds. Obviously, the more facets on the polygon the more the total RPM can be reduced. The present polygon has 20 facets. The number of facets is tied in with the resolution that is desired to be achieved.

To derive the desired resolution the beam must be expanded to a predetermined size as it is passed into the final focussing lens. The larger the beam going into the focussing lens the smaller the spot size. A reciprocal relationship exists between the spot size and beam size entering the focussing lens. The larger the beam going into the focussing lens the smaller the spot size. In other words, when the aperture is small at the focussing lens, the difraction is greater so the diffraction limited spot is larger. Thus, the collimated beam size (aperture) should be larger to obtain a small spot.

PRINTING/COPYING STATION

Referring now to FIGS. 5 and 6, with emphasis first to FIG. 5, there is shown a highly schematic or diagrammatic side elevational view of the electrophotographic process station of the present invention. The block indentified in FIG. 5 as "optical scanning assembly" is meant, for purposes of illustration, to include the complete optical structural arrangement shown in FIG. 2 including the cylindrical focussing lens 44 through which the modulated laser beam 46 passes to impinge upon the rotatable drum 40. The cylindrical lens corrects for any beam motion introduced by the rotating polygon and its associated vertically disposed mirrors.

Drum 40 is provided with a relatively hard, long wearing, photoconductive coating 38 having a high infrared response, FIG. 1 and is adapted to be rotated in the direction of arrow 112. The size of the drum is calculated to accept 11 inch or 14 inch length sheets of plain paper for copying/printing in serial fashion, one after the other, so as to increase the general "throughput" of the apparatus.

Initially the drum 40 has no surface charge on it and no toner. The charge coratron 114, which consists of six wires stretched across, parallel to but out of contact with the drum surface, is electrically energized placing a uniform electrical charge across the photoconductive surface 38. The drum 40 rotates clockwise, so that the light from the laser diode 12 strikes the areas on the drum surface where no printing is desired which discharges the background. The laser diode beam is swept across the length of the drum and selectively modulated with the intelligence necessary to produce the printed matter desired. Each scan line at a resolution of 240 dots per inch will have 240 scan lines per inch of printing. The dots will be generated by turning the laser diode 12 on and off to get the intelligence information on the drum. The drum now has selective regions of electrical charge and regions that are discharged or have no electrical charge thus forming a latent electrostatic image thereon.

The drum next passes to the toner station 116. Toner station 116 has an electrical charge bias supply to the toner 118 with a polarity and magnitude such that the toner is attracted to the drum surfaces 38 in the regions corresponding to where the print will be. At this point in the process, the apparatus has produced a developed image. As the drum 40 continues to rotate further, it comes into the transfer area 120 where the image is to be transferred from the photoconductive drum to the copy material e.g. paper 48. Paper 48 is moved from left to right arrow 122. Two implementations are employed for toner transfer. Both of them use electrostatic means. Nonconductive toner 118 is used. The paper 48 is charged by means of a transfer coratron 124. The coratron wires develop an electrostatic charge field which essentially causes the toner to have a greater attraction towards the paper 48 and the downstream (rightward) detac coratron 126 than it does towards the photoconductive drum 40. The toner effectively lifts off the drum and is applied to the paper. The detac coratron 126 separates the paper 48 from the drum to which is electrostatically attracted. Detac coratron 126 applies a DC pulse at the front or leading edge of the paper to lift the leading edge up. As the paper continues to move under member 126 and as soon as the leading edge is picked up off the drum, an AC electrical potential is applied to member 126. This discharges the paper, the paper 48 thus is lifted off the drum with the toner intact.

The paper carrying the toner image next passes into the fuser 128 which is a combination of pressure and heat produced by means of two opposing roller members 130 and 132, respectively. Thereafter, the paper is passed into the next station of the machine at which time the paper bears an image of the intelligence copied or printed thereon. Although greater than 98 percent of the toner is transferred to the paper 48, in order to offset the problems with residual toner on the photoconductive drum, if any, a preclean coratron 134 and preclean lamp member 136 are used. An AC coratron wire is used at this point with the AC switching polarity between positive and negative, discharges the surface of the drum 40 and also discharges the toner 118. Since light also discharges the surface of the drum a low wattage (8 watt) florescent bar light is used to make sure that all of the charge is removed in addition to the toner. A vacuum cleaning station 138 provided with a rotating bristle brush 140 of soft bristles, with a vacuum applied from a source (not shown) sucks off residual toner which may be on the drum. At this point the drum is considered to be clean as far as toner is concerned. However, since toner was covering some surfaces of the photoconductor that the light from the drum is rotated past a final discharge lamp 142. Light from lamp 142 shines onto a completely cleaned drum removes all residual charge very effectively. The apparatus is now ready to start the copy process again at the charge coratron 114.

If however, the paper for some reason, does not detac or lift up off the drum 40, oppositely disposed stripper finger members 144, which protrude slightly into the drum and into recessed areas at the edges i.e. opposite sides of the paper, catch the paper and tend to lift the paper away from the drum.

There has thus been described a new, novel and heretofore unobvious photo-optical laser diode printing copying apparatus which provides a very high speed, very efficient and very cost effective combination of operational apparatus to provide clean, clear, crisp copies without the attendant problems associated with much of the prior art devices.

What is claimed is:

1. Optical scanning and imaging system utilizing lased diode light generation comprising:
    a solid state laser light generating device producing a divergent electromagnetic visible emission;
    means for collecting and collimating said divergent emission into a beam of light;
    first optical means is the path of said beam for optically shaping said beam effectively reducing the vertical dimension thereof, second optical means in the path of said beam for expanding the horizontal dimension of said beam;
    a rotatable polygon mirror assembly in the path of said light beam and having a plurality of flat mirror facets disposed around the periphey thereof;
    optical focussing means in the path of said beam for bringing said beam into sharp focus on a single facet of said rotatable polygon mirror assembly;
    an angularly disposed adjustably positionable mirror assembly arranged adjacent to said polygon mirror assembly;
    a photoconductive drum rotatably disposed adjacent to said adjustably positionable mirror assembly, and
    an elongated focussing lens interposed between said polygon mirror assembly and said adjustable mirror for bringing said beam into focus on said drum as said beam is moved by said polygon mirror assembly across the surface of said rotatable drum effectively causing said beam to scan said drum from side to side.

2. The invention in accordance with claim 1 wherein said optical scanning system is adjustably mounted to a rigid base assembly for linear movement along fixed guide rails.

3. The invention in accordance with claim 1 wherein said solid state laser and said collimating means are gimbal mounted and disposed on a rigid support pivotally mounted to said rigid base assembly and including a conductive dissipating element for removing heat from said laser.

4. The invention in accordance with claim 3 further including means for slidably positioning said collimating means relative to said laser diode and further including vernier adjusting means for tilting said laser and said collimating means about said rigid support.

5. The invention in accordance with claim 1 wherein light collecting-collimating means comprises a microscope objective which collects the diverging light from the laser and collimates the light into a beam or substantially elliptical cross section.

6. The invention in accordance with claim 1 wherein said first and second optical means comprise optical prisms, said second prism acting to expand said light beam in a horizontal direction producing an exiting beam or circular cross section prior to entering said optical focussing means.

7. The invention in accordance with claim 1 wherein said adjustable mirror assembly further includes both a vertical as well as a horizontal tilt adjusting means for accurately positioning said beam at the surface of said photoconductive drum.

8. The invention in accordance with claim 1 wherein said elongated focussing lens comprises a cylindrical optical assembly.

9. Optical scanning and imaging system utilizing laser diode light generation comprising;
    a solid state laser light generating device producing a divergent electromagnetic visible emission;
    means for collecting and collimating said divergent emission into a beam of light;
    first optical means in the path of said beam for optically shaping said beam effectively reducing the vertical dimension thereof, second optical means in the path of said beam for expanding the horizontal dimension of said beam;
    a rotatable polygon mirror assembly in the path of said light beam and having a plurality of flat mirror facets disposed around the periphery thereof;
    optical focussing means positioned in the beam path subsequent to the beam reflecting off a selected facet of said polygon.
    an angularly disposed adjustable positionable mirror assembly arranged adjacent to said polygon mirror assembly,
    a photoconductive drum rotatably disposed adjacent to said adjustably positionable mirror assembly, and
    an elongated focussing lens interposed between said polygon mirror assembly and said adjustable mirror for bringing said beam into focus on said drum as said beam is moved by said polygon mirror assembly across the surface of said rotatable drum effectively causing said beam to scan said drum from side to side.

10. The invention in accordance with claim 1 wherein said laser is mounted to a thermoelectric cooling member and wherein said cooling member and said laser are gimbal mounted to said rigid support including vertical and horizontal adjustment means for said laser.

* * * * *